Sept. 12, 1933.     G. D. HOFFMAN     1,926,537
ELECTRIC HEATER
Filed May 29, 1931     2 Sheets-Sheet 1
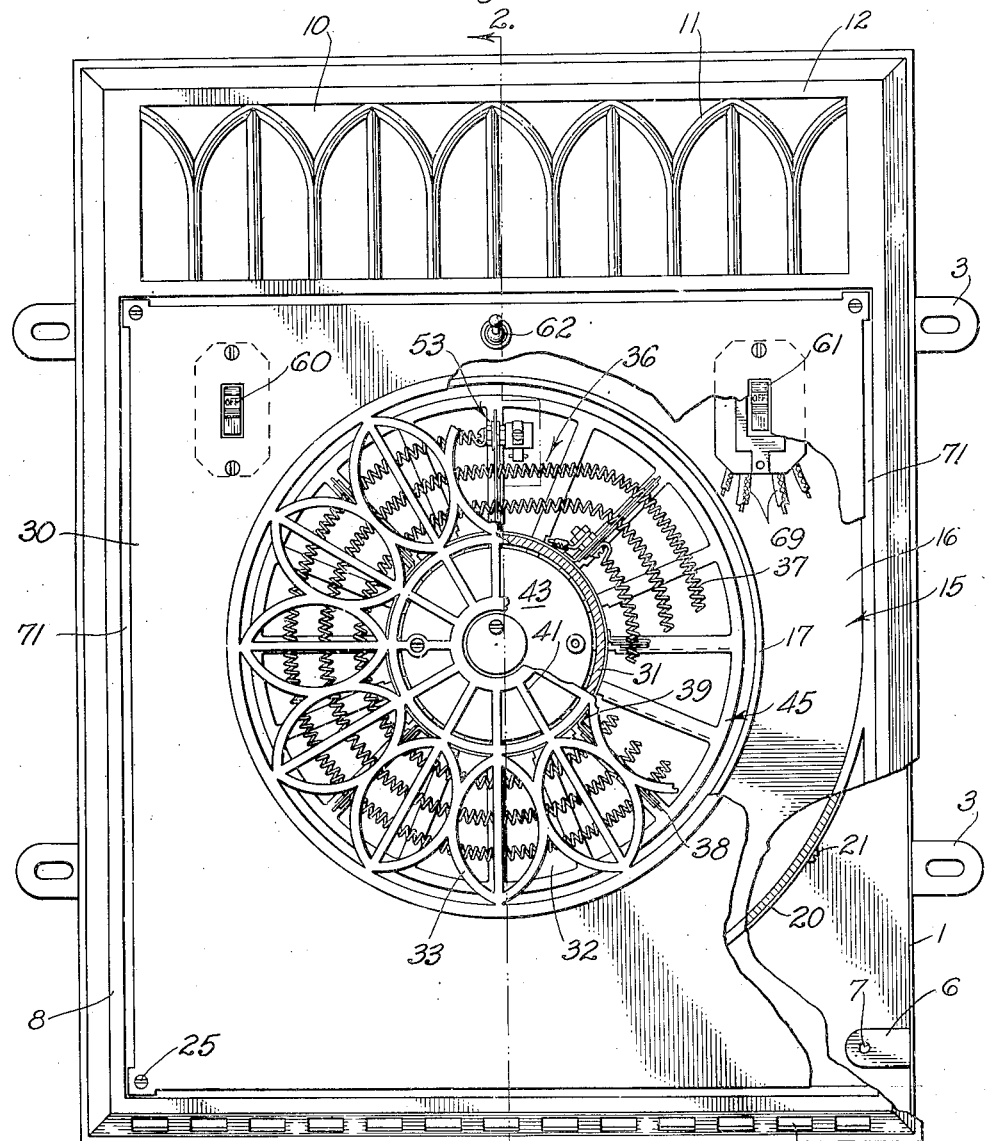
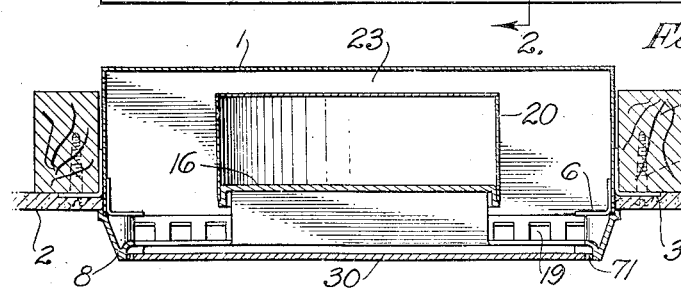
INVENTOR:
George D. Hoffman,
BY
Fred W. Lann
ATTORNEY.

Sept. 12, 1933.   G. D. HOFFMAN   1,926,537
ELECTRIC HEATER
Filed May 29, 1931   2 Sheets-Sheet 2
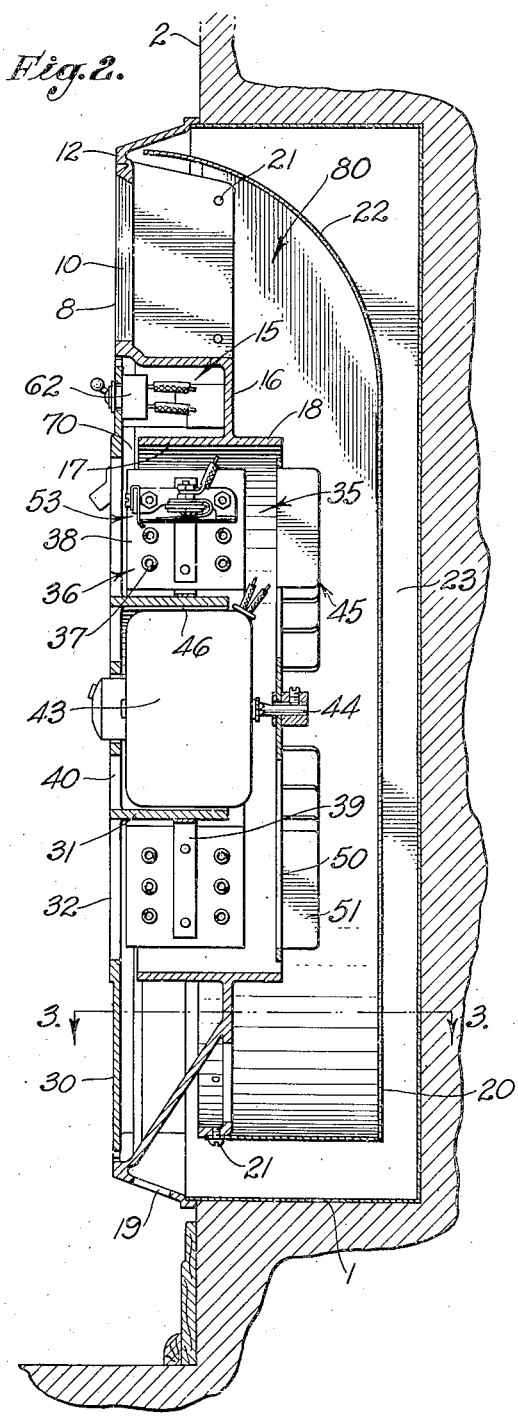
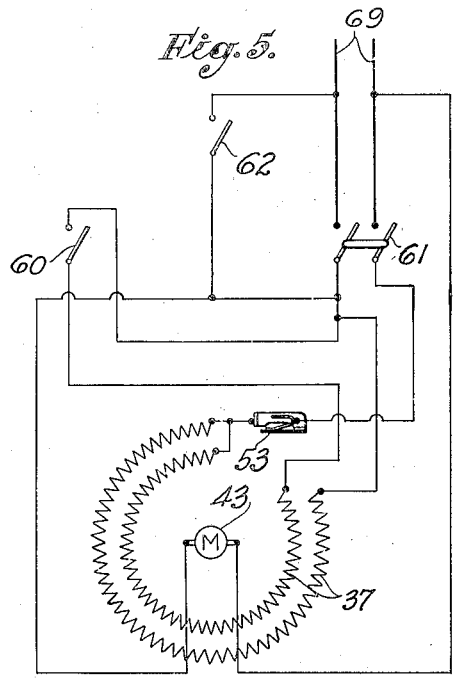
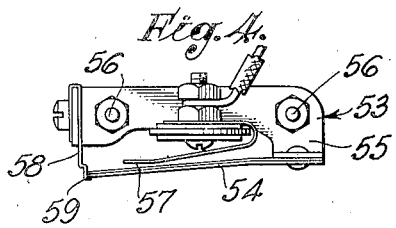
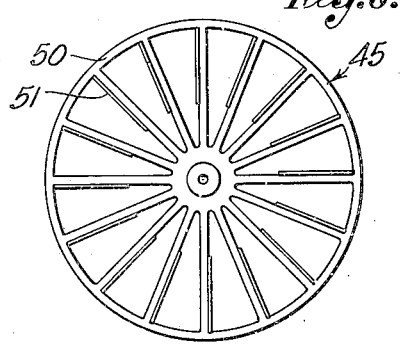
INVENTOR:
George D. Hoffman,
BY
ATTORNEY.

Patented Sept. 12, 1933

1,926,537

UNITED STATES PATENT OFFICE 1,926,537

ELECTRIC HEATER

George D. Hoffman, Pasadena, Calif., assignor, by mesne assignments, to Thermador Electrical Manufacturing Co., Los Angeles, Calif., a corporation of California Application May 29, 1931. Serial No. 540,907

18 Claims. (Cl. 219—39)

My invention relates to electric heaters and particularly to heaters which are especially adapted to be used for heating rooms. It embodies a heater having a mechanically induced draft therethrough and the embodiment shown embodies a heater adapted to be placed between the studding in a wall.

An object of the invention is to provide an electric heater having means for positively moving the air to be heated (by means of an electric motor and fan) through the heater in such volume that the heating element is maintained at a low temperature, commercial heaters embodying my invention operating with a maximum temperature in the heating element below the boiling temperature of water under atmospheric conditions.

A further object of the invention is to provide an electric heater having a mechanically induced circulation of air in which the temperature of all external parts is very much lower than the temperature of the heating coils, commercial heaters which embody my invention operating in such a manner that the hand can be held without discomfort on all exposed parts.

A further object of the invention is to provide an electric heater in which a motor is used to operate a fan producing a rapid circulation of air through the heater, and in which the motor is not only shielded from the heat of the heating element, but is cooled by said circulation so that the motor operates at low temperature at all times, thus insuring satisfactory operation of and long life for the motor.

A further object of the invention is to provide an electric heater embodying an electric heating element, a motor and fan, and suitable switches for controlling same, all of which are mounted on a single member, which in the embodiment shown is a flat plate, so that these various elements can be mounted all in their proper relationship on this plate before this plate is secured in the heater, thus making the operative parts of the heater a single unitary assembly which can be quickly, cheaply, and accurately assembled.

A further object of the invention is to provide a thermostat which is so placed that it will cut off the current from the heating element if for any reason the temperature of this heating element exceeds a predetermined maximum, and immediately restore current to the heating element whenever the temperature thereof falls below a predetermined minimum.

Further objects and advantages will be made evident throughout the following part of the specification.

In the drawings, which are for illustrative purposes only:

Fig. 1 is a front view of the heater.

Fig. 2 is a sectional elevation on the line 2—2 of Fig. 1.

Fig. 3 is a sectional plan on the line 3—3 of Fig. 2.

Fig. 4 is a side elevation of the thermostat.

Fig. 5 is a diagram of the electrical connections.

Fig. 6 is an elevation of the fan.

In the form of heater shown there is provided a housing 1 which is preferably formed of sheet steel and is built into a cavity in the wall 2 of a room, being secured by means of lugs 3 and screws 4 to the studding 5 forming a portion of the wall. The lugs 3 and the screws 4 are covered with plaster or other finish. The housing 1 is intended to be put in place at the time the building is being built and remains in place thereafter.

Projecting inwardly from the side walls of the housing 1 are lugs 6 having holes 7 by which a body 8 is secured to the housing. This body 8 in the form shown consists of a casting of suitable alloy and is provided with an outlet opening 10 at the top thereof, this opening having a light grid 11 which is added partly for ornamental purposes and partly to close off the interior of the heater and prevent foreign substances from entering the heater.

In the form shown the body projects a slight distance from the face of the wall 2 and has a flat front 12. Formed in the front of the body 8 is a recess 15, and projecting forwardly from the back 16 of the recess is a hollow cylindrical wall 17, this wall also projecting as shown at 18 rearwardly from the back 16 of the recess 15. Openings 19 are provided in the bottom of the body for the purpose of giving access to the space behind the recess 15. A pan 20 is provided, secured by means of screws 21 to the body 8, this pan fitting inside the housing 1 and being curved at its upper end as shown at 22. A space 23 is thus provided between the back of the pan and the housing 1. Secured by means of screws 25 to the body 8 is a front plate 30, this front plate also is the form shown consisting of a casting.

Projecting rearwardly from the front plate is an inner hollow cylindrical wall 31 and surrounding the wall 31 is an air inlet opening 32 which in the form shown is partially covered by a grill 33 which is provided partly for ornamental purposes and partly to protect the interior of the heater from the intrusion of foreign objects.

Between the outer hollow cylindrical wall 17 and the inner hollow cylindrical wall 31 is a space 35 in which is placed a heating element 36. This heating element consists of coils of wire 37 which are supported in mica plates 38, these mica plates being disposed radially in the annular space 35 and being carried on a metallic framework 39 secured to the inner hollow cylindrical wall 31. An opening 40 is provided through the front plate 30 inside the inner hollow cylindrical wall 31, this opening being partially closed by a grill 41.

Situated inside the hollow cylindrical wall 31 behind the plate 30 is a motor 43 which is provided with a shaft 44 on which a fan 45 is secured. The motor 43 does not entirely fill the space inside the inner hollow cylindrical wall, a ventilating duct 46 being left between the outside of the motor and the inner surface of this wall.

The fan may be of any convenient form, being preferably a flat plate 50 having radial fins 51 formed thereon.

Secured to the framework 39 is a thermostat 53 of the form shown in Fig. 4, this thermostat consisting of a bimetallic element 54 which is secured to a frame 55. This frame 55 is secured to the framework 39 by bolts 36 which are provided with suitable electrical insulation. A contact finger 57 is also secured to but insulated from the support 55. A retarding finger 58 is also secured to the member 55, being provided with a notch 59 in which the end of the bimetallic member 54 rests. This thermostat is placed as shown in Fig. 2 in such a position that it is adjacent the heating coils 37 so that it is readily affected by the radiant heat from these heating coils. Three switches 60, 61, and 62 are provided. Switches 60 and 62 are single pole switches and the switch 61 is a double pole switch.

The heating coils, motor, thermostat, and switches are connected as shown in Fig. 5, in which 69 represents wires leading to the source of supply. The heating element 36 is preferably arranged in two series, as shown in the diagram, the switch 61 serving to disconnect both series from the line 69 when it is open. The switch 60 serves to disconnect one of these lines when the switch 61 is closed. The switch 62 is connected in series with the motor so that when the switch 62 is closed and the switch 61 is open, the motor may be operated. It will be noted that the switch 61 is so arranged that the heating coils cannot be energized without energizing the motor, and the switch 62 is so arranged that the motor can be energized without energizing the heating coils. The thermostat 53 is placed in series with the heating coils and owing to the peculiar arrangement of the thermostatic strip 54 and the notch 59 it snaps from open position as shown in Fig. 4 back into a closed position in which the thermostatic strip contacts with the finger 57. The thermostatic strip 54 is so arranged that it is normally held in contact with the finger 57 so that the coils can be energized. In the event that the coils 37 overheat for any reason, as for example due to a failure of the motor, the thermostatic strip snaps into the position shown in Fig. 4 as soon as it is sufficiently heated, thus opening the circuit to the heating coils. It should be noted that as soon as the thermostatic strip cools, it snaps back and establishes contact so that no attention need be given to the thermostatic strip, it operating automatically in both directions.

The method of construction above described provides certain advantages in manufacture and assembly. The housing 1 is permanently installed in the wall. The body 8 is then secured thereto by bolts passing through the holes 7 and need not thereafter be disturbed. The front plate 30 carries all of the operating parts of the device, such as the heating coils 37, the motor 43, thermostat 53, and the switches 60, 61, and 62. All of these parts can be assembled upon the plate 30 outside the heater. They can also be readily removed for repair at any time by removing the screws 25.

It will also be noted that there is an opening 70 left between the outer end of the outer hollow cylindrical wall 17 and the inner side of the front plate of the body 8 so that the front end of the space 35 is in open communication with that portion of the recess outside the outer hollow cylindrical wall 17, this space being in open communication with the outer air through air inlet openings 71 which are formed between the outer edges of the plate 30 and the body 8.

The method of operation is as follows:

Current being supplied through the wires 69, the switch 61 is closed. The switches 60 and 62 can also be either closed or open. The motor is thus energized and starts to rotate the fan, and the heating coils are energized through the thermostat 53. The fan 45 being rotated, tends to throw off air from its periphery, drawing this air through the space 35 through the ventilating duct 46 and through the opening 70 and the air inlet 71. Air is thus continuously drawn in large volume from the colder air in the lower part of the room through the space 35 and through the ventilating duct and in a somewhat smaller volume through the opening 70 and the air inlet 71. The air drawn through the ventilating duct 46 tends to cool the motor, which is protected from any radiant heat from the heating element 36 by the inner hollow cylindrical wall 31. This passing of air through the ventilating duct 46 tends to cool the motor and thus insures its operation over long periods without attention. The air drawn through the space 35 is heated by the coils 37.

The proportions of the fan and heating coils are such that with both of the heating coils in circuit and the fan operating at normal speed, heat may be transmitted to the air passing through the coils with sufficient rapidity to prevent these coils ever attaining a temperature in excess of the boiling point of water under atmospheric conditions. This is particularly important in an electric heater as it greatly minimizes the fire hazard. If, for any reason, the motor 43 should become injured so that the temperature of the heating coils goes above this maximum limit, the thermostat operates and disconnects the heating coils. The constant circulation of air through the air inlet 71 into the recess 15 and from the recess through the opening 70, and the circulation of air through the openings 32 and 40, tend to keep the front plate 30 of the heater at a very low temperature at all times, so low in fact that the hand may be held upon the front of the heater without discomfort.

The air thrown off from the fan 45 passes upwardly through a passage 80 formed between the pin 20 and the body 8 and is forced out through the outlet opening 10, being projected outwardly into the room at considerable velocity at a point higher than the intake. The tendency of the air to occupy a position in the room solely dependent upon its temperature, with the warmest air adjacent the ceiling and the coldest air adjacent the floor, is thus overcome by the rapid movement of the heated air substantially horizontally on a plane above the intake, and the thorough mixture of the heated and unheated air which occurs where the different portions of the stream of heated air lose their velocity.

If it is desired to operate the heater at a lower heating rate, the switch 60 may be opened, which cuts out of circuit one of the coils 37, and the heater will thereafter operate at one-half its rated capacity.

If, for any reason, it is desired to use the heater as an air circulating device, the switch 61 is opened, thus cutting the heating coils out of circuit, and the switch 62 is closed, which causes the motor 43 to operate with no heat being delivered from the heating element 36. The device then operates as a circulating fan, tending to equalize the temperature in the room.

It will be noted that by the above structure the objects set forth at the beginning of the specification are very completely realized.

I claim as my invention:

1. In an electric heater, the combination of: a body having a recess extending rearwardly from the front thereof; an outer hollow cylindrical wall projecting forwardly from the back of said recess; a plate secured in and partially closing the front of said recess; an inner hollow cylindrical wall projecting rearwardly into said recess from the back of said plate, said inner hollow cylindrical wall being concentric with said outer hollow cylindrical wall; an electric heating element in the space between said outer hollow cylindrical wall and said inner hollow cylindrical wall; walls forming a passage terminating in an opening in said body, outside said outer hollow cylindrical wall, said passage being in open communication with the free air in front of said body through said opening, said passage also being in open communication with said space at the rear end thereof; and means for positively forcing air through said space and said passage.

2. In an electric heater, the combination of: a body having a recess extending rearwardly from the front thereof; an outer hollow cylindrical wall projecting forwardly from the back of said recess; a plate secured in and partially closing the front of said recess; an inner hollow cylindrical wall projecting rearwardly into said recess from the back of said plate, said inner hollow cylindrical wall being concentric with said outer hollow cylindrical wall; an electric heating element in the space between said outer hollow cylindrical wall and said inner hollow cylindrical wall; walls forming a passage terminating in an opening in said body outside said outer hollow cylindrical wall, said passage being in open communication with the free air in front of said body through said opening, said passage also being in open communication with said space at the rear end thereof; a motor inside said inner hollow cylindrical wall; and a fan driven by said motor and so placed as to cause air to circulate through said passage and said space.

3. In an electric heater, the combination of: a body having a recess extending rearwardly from the front thereof; an outer hollow cylindrical wall projecting forwardly from the back of said recess; a plate secured in and partially closing the front of said recess; an inner hollow cylindrical wall projecting rearwardly into said recess from the back of said plate, said inner hollow cylindrical wall being concentric with said outer hollow cylindrical wall; an electric heating element in the space between said outer hollow cylindrical wall and said inner hollow cylindrical wall; walls forming a passage terminating in an opening in said body outside said outer hollow cylindrical wall, said passage being in open communication with the free air in front of said body through said opening, said passage also being in open communication with said space at the rear end thereof; a motor inside said inner hollow cylindrical wall; and a fan secured to the shaft of the motor rearwardly of the motor and so placed as to cause air to circulate through said passage and said space.

4. In an electric heater, the combination of: a body having a recess extending rearwardly from the front thereof; an outer hollow cylindrical wall projecting forwardly from the back of said recess; a plate secured in and partially closing the front of said recess; an inner hollow cylindrical wall projecting rearwardly into said recess from the back of said plate, said inner hollow cylindrical wall being concentric with said outer hollow cylindrical wall; an electric heating element in the space between said outer hollow cylindrical wall and said inner hollow cylindrical wall; walls forming a passage terminating in an opening in said body outside said outer hollow cylindrical wall, said passage being in open communication with the free air in front of said body through said opening, said passage also being in open communication with said space at the rear end thereof; a motor inside said inner hollow cylindrical wall; and a fan secured to the shaft of the motor rearwardly of the motor and extending across the rear end of said space between said space and said passage.

5. In an electric heater, the combination of: a body having a recess extending rearwardly from the front thereof; an outer hollow cylindrical wall projecting forwardly from the back of said recess; a plate secured in and partially closing the front of said recess; an inner hollow cylindrical wall projecting rearwardly into said recess from the back of said plate, said inner hollow cylindrical wall being concentric with said outer hollow cylindrical wall; an electric heating element in the space between said outer hollow cylindrical wall and said inner hollow cylindrical wall; walls forming a passage terminating in an opening in said body outside said outer hollow cylindrical wall, said passage being in open communication with the free air in front of said body through said opening, said passage also being in open communication with said space at the rear end thereof; a motor inside said inner hollow cylindrical wall; and a fan secured to the shaft of the motor rearwardly of the motor and extending across the rear end of said space between said space and said passage and so formed and driven as to draw air through said space and force it through said passage.

6. In an electric heater, the combination of: a body having a recess extending rearwardly from the front thereof; an outer hollow cylindrical wall projecting forwardly from the back of said recess; a plate secured in and partially closing the front of said recess, said outer cylindrical wall being separated from said front plate by an annular opening; an inner hollow cylindrical wall projecting rearwardly into said recess from the back of said plate, said inner hollow cylindrical wall being concentric with said outer hollow cylindrical wall; an electric heating element in the space between said outer hollow cylindrical wall and said inner hollow cylindrical wall, said space being in open communication through said annular opening with that portion of said recess outside said outer cylindrical wall; walls forming a passage terminating in an opening in said body outside said outer hollow cylindrical wall, said passage being in open communication with the free air in front of said body through said opening, said passage also being in open communication with said space at the rear end thereof; and means for positively forcing air through said space and said passage.

7. In an electric heater, the combination of: a body having a recess extending rearwardly from the front thereof; an outer hollow cylindrical wall projecting forwardly from the back of said recess; a plate secured in and partially closing the front of said recess, said outer cylindrical wall being separated from said front plate by an annular opening; walls forming an opening in said body through which that portion of the recess outside said outer cylindrical wall is in open communication with the free air in front of said body; an inner hollow cylindrical wall projecting rearwardly into said recess from the back of said plate, said inner hollow cylindrical wall being concentric with said outer hollow cylindrical wall; an electric heating element in the space between said outer hollow cylindrical wall and said inner hollow cylindrical wall, said space being in open communication through said annular opening with that portion of said recess outside said outer cylindrical wall; walls forming a passage terminating in an opening in said body outside said outer hollow cylindrical wall, said passage being in open communication with the free air in front of said body through said opening, said passage also being in open communication with said space at the rear end thereof; and means for positively forcing air through said space and said passage.

8. In an electric heater, the combination of: a body having a recess extending rearwardly from the front thereof; an outer hollow cylindrical wall projecting forwardly from the back of said recess; a plate secured in and partially closing the front of said recess; an inner hollow cylindrical wall projecting rearwardly into said recess from the back of said plate, said inner hollow cylindrical wall being concentric with said outer hollow cylindrical wall; an electric heating element in the space between said outer hollow cylindrical wall and said inner hollow cylindrical wall; walls forming a passage terminating in an opening in said body outside and above said outer hollow cylindrical wall, said passage being in open communication with the free air in front of said body through said opening, said passage also being in open communication with said space at the rear end thereof; and means for positively forcing air through said space and said passage.

9. In an electric heater, the combination of: a body having a recess extending rearwardly from the front thereof; a plate secured in the front of said recess; a hollow cylindrical wall extending forwardly from the back of said recess, there being an annular opening between the front of said hollow cylindrical wall and the back of said plate; and means for positively drawing air into the interior of said hollow cylindrical wall through said opening.

10. In an electric heater, the combination of: a body having a recess extending rearwardly from the front thereof; a plate secured in the front of said recess, said plate being so secured as to leave an air inlet between said plate and said body; a hollow cylindrical wall extending forwardly from the back of said recess, there being an annular opening between the front of said hollow cylindrical wall and the back of said plate; and means for positively drawing air into the interior of said hollow cylindrical wall through said opening.

11. In an electric heater, the combination of: a body having a recess extending rearwardly into said body; a plate secured in the front of said recess; walls forming an air passage through said heater, an electric heating element in said passage secured to and removable with said plate; and an electrically driven fan in said passage secured to and removable with said plate.

12. A heater comprising: an annular heating element providing a central opening; a motor positioned in said opening and including a rearwardly extending shaft; a fan on said shaft and of a diameter substantially as large as said annular heating element, said fan drawing air through said heating element and around said motor; and walls forming a passage into which said fan discharges and communicating through the front of said heater with the atmosphere.

13. A heater comprising: an annular heating element providing a central opening; a motor positioned in said opening and including a rearwardly extending shaft; a heat insulating wall providing an air circulating space around said motor; a fan on said shaft and of a diameter substantially as large as said annular heating element, said fan drawing air through said heating element and around said motor; and walls forming a passage into which said fan discharges and communicating through an opening the front of said heater with the atmosphere.

14. A wall heater comprising: a heating element; a wall defining an opening centrally disposed relative to said heating element; a motor positioned in said opening and spaced from said wall to provide an air circulating space therearound; a fan on said motor of a diameter substantially as large as said annular heating element, said fan drawing air through said heating element and said space; and walls forming a passage into which said fan discharges and communicating through the front of said heater at a section beyond said heating element.

15. A wall heater comprising: an annular heating element; an annular wall defining an opening centrally disposed relative to said heating element; a motor disposed in said opening and being insulated from said heating element by said wall; a fan on said motor for drawing air through said heating element and around said motor; and walls forming a passage rearwardly of said heating element into which said fan discharges and communicating through an opening in the front of said heater with the atmosphere.

16. A heater comprising: a pan having a vertically extending wall; a removable front plate providing openings therein and extending across a portion of said pan; a motor removable with said front plate; a fan on the rear of said motor and positioned adjacent said vertical wall; a heating means around said motor and adjacent said openings whereby the incoming air is heated and drawn through said fan; and walls forming a passage extending forward from said vertically extending wall and communicating with the atmosphere at a point above said openings of said front plate.

17. A wall heater including a body having an outer wall; an inner wall inside said outer wall; a heating element between said walls; a motor inside said inner wall and spaced therefrom to define a circulation duct; a fan on said motor and providing blades extending substantially across the rear of said heating element in a manner to draw air therethrough and through said circulation duct; and walls forming a discharge passage communicating with the discharge of said fan and with the air in front of said heater at a point above said heating element.

13. A wall heater including a body having an outer wall; an inner wall inside said outer wall and removably connected to said body; a heating element between said walls; a motor inside said inner wall and spaced therefrom to provide a circulation duct; a fan on said motor at the rear of said heating element for drawing air therethrough and through said circulation duct; and walls forming a discharge passage communicating with the discharge of said fan and with the air in front of said heater at a point above said heating element.

GEORGE D. HOFFMAN.

CERTIFICATE OF CORRECTION.

Patent No. 1,926,537.　　　　　　　　　　　　　September 12, 1933.

GEORGE D. HOFFMAN.

It is hereby certified that error appears in the printed specification of the above numbered patent requiring correction as follows: Page 4, line 112, claim 13, after "opening" insert the word "in"; and that the said Letters Patent should be read with this correction therein that the same may conform to the record of the case in the Patent Office.

Signed and sealed this 24th day of October, A. D. 1933.

(Seal)

F. M. Hopkins
Acting Commissioner of Patents.